United States Patent [19]

Acuna

[11] Patent Number: 4,759,857
[45] Date of Patent: Jul. 26, 1988

[54] OPEN SIPHON FILTER METHOD

[76] Inventor: Eduardo M. Acuna, Paseo de los Descubridores 216 4° Sector, Monterrey, N.L.C.P., Mexico, 64610

[21] Appl. No.: 892,995

[22] Filed: Aug. 4, 1986

[51] Int. Cl.⁴ ............................................. C02F 1/100
[52] U.S. Cl. .................................... 210/741; 210/742; 210/767; 210/776
[58] Field of Search .................... 210/416.1, 496, 508, 210/741, 742, 767, 776

[56] References Cited

U.S. PATENT DOCUMENTS

| 51,611 | 12/1865 | Noyes. | |
|---|---|---|---|
| 622,562 | 4/1899 | Sutton. | |
| 628,088 | 7/1899 | Giles. | |
| 676,121 | 6/1901 | Busenbenz. | |
| 752,575 | 2/1904 | Mosher. | |
| 1,556,732 | 10/1925 | Sterrick. | |
| 2,457,851 | 1/1949 | Taft | 62/1 |
| 2,515,569 | 7/1950 | Pozun | 4/225 |
| 2,520,056 | 8/1950 | Pozun | 4/228 |
| 2,770,492 | 11/1956 | Kuss | 299/20 |
| 3,236,757 | 2/1966 | Litt | 204/149 |
| 3,236,768 | 2/1966 | Litt | 210/23 |
| 3,266,630 | 8/1966 | Litt | 210/404 |
| 3,977,364 | 8/1976 | Gijsbers et al. | 122/366 |
| 4,126,556 | 11/1978 | Swanson et al. | 210/242 |
| 4,280,658 | 7/1981 | Ehrrich | 239/6 |
| 4,286,754 | 9/1981 | Jones | 239/6 |

FOREIGN PATENT DOCUMENTS 7506932 6/1976 Brazil.
151565 11/1979 Japan.
011056 1/1980 Japan.
116419 9/1980 Japan.

OTHER PUBLICATIONS

J. S. Watson, et al. A radioisotopic Tracer Method for Measurement of Solids Concentration in a Settling Bed of Solids, Feb. 1986, pp. 200-206.
C. Gruesbeck and R. E. Collins, Entrainment and Deposition of Fine Particles in Porous Media, Dec. 1982, pp. 847-856.
S. S. Sollee, et al. Field Application of Clean Completion Fluids, Sep. 1985, pp. 1-72.
The Filterite, Cartridge Filtration Guide, A Technical Guide to Better Filtration, published by Brunswick Technetics, Oct., 1980, pp. 1-20.

Primary Examiner—Richard V. Fisher
Assistant Examiner—Coreen Y. Lee
Attorney, Agent, or Firm—Vaden, Eickenroht, Thompson & Boulware

[57] ABSTRACT

A siphon fluid-solid separation apparatus and a process, wherein a liquid having undissolved solids is introduced into an upper vessel. The liquid and smaller particles of undissolved solids are drawn away from the larger particles of undissolved solids by siphonage. In one embodiment, the larger particles of undissolved solids settle to the bottom of the upper vessel. The smaller particles of undissolved solids are deposited in a porous medium as the liquid and smaller particles of undissolved solids flow through the porous medium by siphonage.

2 Claims, 2 Drawing Sheets

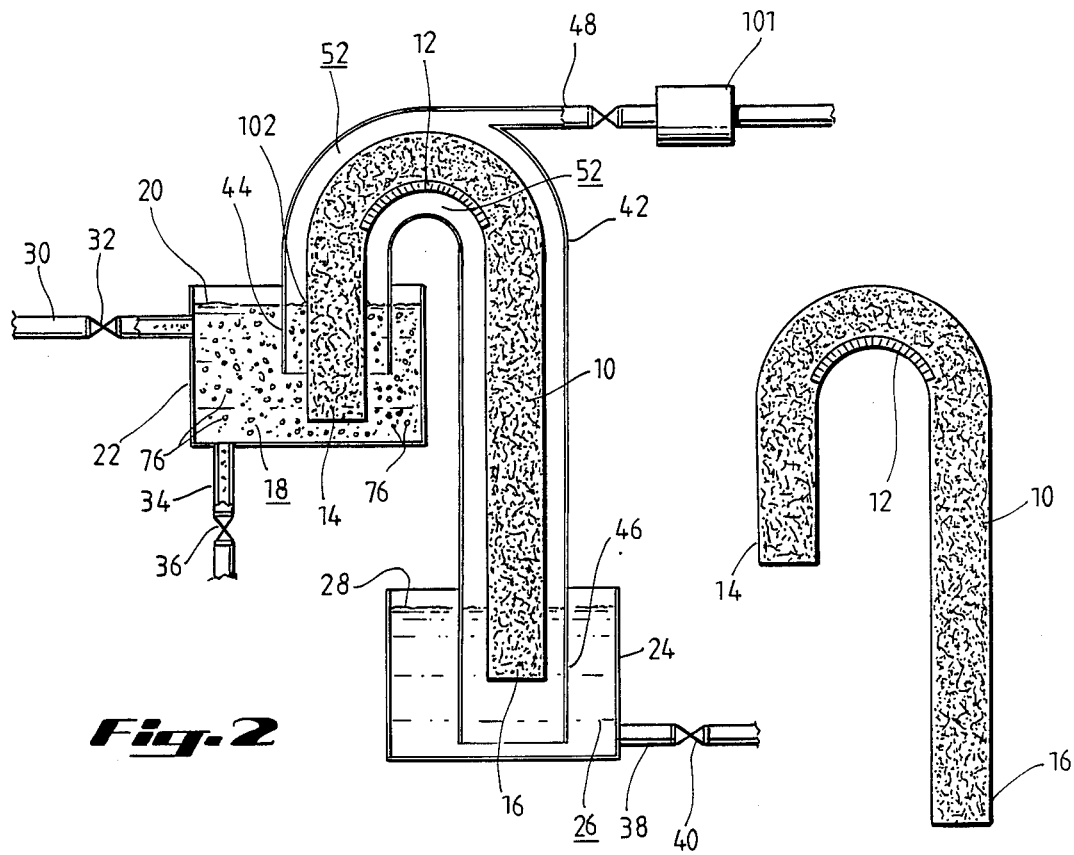
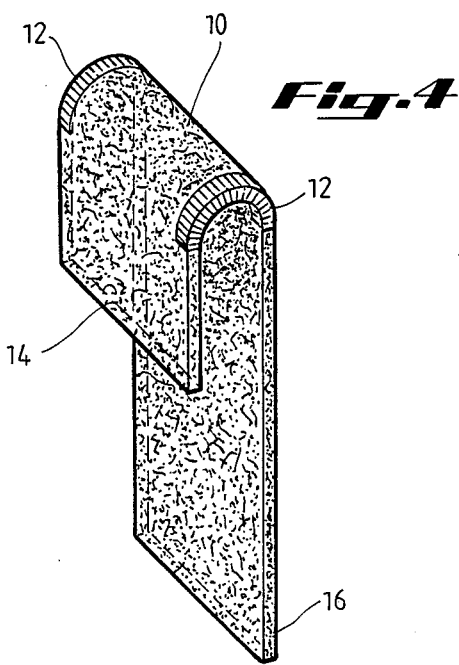
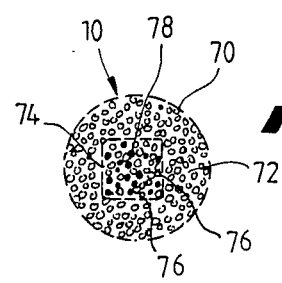
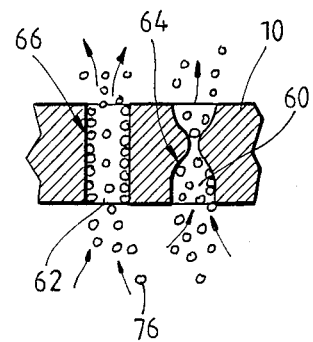

OPEN SIPHON FILTER METHOD

BACKGROUND OF THE INVENTION

1. Field of the Invention

This invention relates generally to liquid purification or separation and more particularly to liquid-solid separation by siphonal filtration through the use of a porous filter medium.

Liquid-solid separations are important in industry, medicine and the sciences. Processes and apparatus for such separations can be divided into two broad categories: (a) those for separating liquids and dissolved solids and (b) those for separating liquids and undissolved solids. This invention provides a process and apparatus for separating liquids and undissolved solids.

2. Description of the Prior Art

The prior art provides siphonage for transporting liquids. The prior art also shows filters. However, the prior art known to Applicant does not disclose a process or apparatus which prevents "cake" formation by undissolved solids in any filter/transport system from obstructing liquid flow. Cake formation in prior art siphons obstructs liquid flow and requires cleaning.

For purposes of this application, "siphon filter" is used to describe a porous medium which is capable of transporting liquid from one level to a lower level by siphonage while substantially preventing the transportation of undissolved solids above a given size. The transportation can be accomplished in two ways. First, the liquid can be drawn out of a container (reservoir up to a higher elevation and then downward to a level below the surface of the liquid. Second, the liquid can be taken from the reservoir directly to a lower level without first rising to a higher elevation.

Siphons can be classified in two categories: (a) closed siphons and (b) open siphons.

Closed siphons are conduits, such as pipes or hoses, usually configured in an inverted U-shape with an intake end and a discharge end. A hydraulic gradient created by the difference in levels between the intake end and the discharge end causes liquid to flow through the siphon.

Open siphons are characterized by the absence of a pre-defined conduit acting as a siphon. Nevertheless, the intake end of an open siphon must pass through the plane of the surface of the liquid. The liquid does not have to be transported further above the liquid surface level by the siphon, but the siphon must at least intersect the interface between the surface of the liquid and the gas above the liquid. The "conduit" of an open siphon filter is the outermost layer of liquid that wets a porous medium. The porous medium is the scaffolding inside of which the envelope of liquid forms. The medium contains multiple interconnected passages. The liquid flows through the medium by siphonage. Above the liquid, the porous medium contacts a gas phase such as vapor of the same liquid, atmospheric gas, or other gases or vapors. Although normally one would prime the siphon by saturating the porous medium, this is not necessary. Porous media can self-prime. Capillary action raises liquid from the surface of the reservoir into the porous media. Once liquid reaches the top portion, a very slow process by capillary action, gravity will pull the liquid down toward the outlet end of the medium. At this point, capillary action is overcome by siphonage and liquid flow increases.

The prior art shows apparatus which use porous media for moving, transferring, supplying, or dispensing liquids to lower levels by siphonage. Examples of porous media are: bundles of fibers, matted filamentous material, micro-porous membranes, and sorbent material. See U.S. Pat. Nos. 2,770,492; 2,515,569; 2,520,056; and 2,457,851. However, these patents do not deal in any way with filtering or liquid solid separation. They do not address the problem of filtering, they do not solve the problems of filtering, and they do not teach selecting a porous medium that is related to excluding undissolved solids of a given size.

U.S. Pat. No. 4,280,658 to Ehrrich discloses a process and apparatus for liquid supplying and liquid cleaning through capillary action. However, Ehrrich does not teach or deal with the separation action of the present invention. His device transports liquid with siphonage, but it filters with capillary action. Filtration takes place at the second vessel where the micro-porous membrane is placed. Capillary action, not siphonage, filters the liquid as it travels through the membrane from the bottom to the surface where it is evaporated. No hydraulic gradient is involved during filtration in Ehrrich's invention.

U.S. Pat. No. 4,126,556 to Swanson discloses an apparatus for removal of an emersed chemical from a chemical mixture. Here, a porous material capable of absorbing the chemical to be separated is positioned as a siphon, and that specific chemical is removed. Although employing the structure of an open siphon, Swanson uses a system capable of siphonage only for transportation. He does not remove solids from a mixture of liquids; he removes one liquid chemical from a mixture of liquid chemicals by using a chemically specific wick. (See column 7, lines 1–5.) Swanson does not suggest separating all liquids from undissolved solids by using the same medium, nor does he deal with any of the clogging problems found with traditional filters.

U.S. Pat. No. 3,236,768 to Litt discloses a structure which could be taken as an open siphon filter, but it does not suggest or teach the present invention. Litt discloses a process for water purification using a capillary lattice. The lattice in Litt comprises a body or mass which is compacted enough not to have any passages of a size which serve merely as siphon conduits. Water, by capillary diffusion and under gravity, moves inwardly and downwardly through the lattice leaving behind ions collected on the lattice's faces. The lattice is a matted filamentous material compacted so much that it eliminates any passages capable of serving as siphon conduits. Additionally, Litt deals with separation of ionic particles, i.e., dissolved solids. He never suggests to apply his invention for separation of undissolved solids. He expressly states that heavy or gross solids can be removed by conventional mechanical filters (see for example, column 2, lines 41–44 and column 3, lines 33–35).

The art knows closed siphon filters for liquid purification or separation; for example an abstract obtained of Japanese Patent No. 55116419 dated 80-09-08 describes a method for producing a filtering element for filtering liquids. That patent teaches capillary forming raw material charged in a straight pipe, bent into a U-shape and placed to form an inverted U-shaped solid siphon pipe. Also, Japanese Patent Nos. 55011056 dated 80-01-25 and 54151565 dated 79-11-28 describe closed capillary filters comprising a number of tubes dipped at one end into a bath of liquid to be filtered, each of the tubes being packed by a bundle of filaments to draw the liquid from the bath into the tube by capillary action. They do not disclose open siphon filters.

Closed siphon filters present the same drawbacks as conventional filters. In those filters, a cake of undissolved solid particles is formed at the intake end of the closed siphon, this cake plugs the closed siphon at the rigid wall and obstructs liquid flow. Consequently, they need frequent cleaning and removal of the cake. The small pressure difference obtained by the hydraulic gradient of a siphon makes the closed siphon filter unsuitable for many applications since the cake requires higher pressure differentials for liquid flow. The pressure friction losses through the cake at the intake end can stop the siphoning action very quickly. Conventional filters require pumps or vacuums to create pressure differences high enough to force liquid past cake.

The present invention overcomes these drawbacks. As the liquid passes into the porous medium, particles which are large enough to be "undesirables" stop at the intake portion of the porous medium and form a cake. As the cake grows, it becomes heavier and falls away. Low flow rates keep the cake from becoming lodged. The most convenient manner in which to obtain the proper flow rate through the open porous medium is by configuring the medium as a siphon, but the proper flow rates needed for laminar flow may be realized through other manners.

It is an object of the present invention to provide a method and an apparatus for separating a liquid from undissolved solid particles through an open siphon filter.

It is another object of the invention to provide a method and an apparatus for filtering a liquid in an easy and economical manner with a wide range of successful applications.

It is another object of the invention to provide a method and an apparatus for filtering a liquid wherein the flow rate is enhanced by decreasing the pressure of a gas contained within the filter.

It is a further object of the invention to provide a method and an apparatus for filtering a liquid with minimal evaporation.

It is another object of the invention to provide a method and an apparatus for filtering liquid wherein a gaseous atmosphere of a desired composition contacts the open siphon filter.

Other objects and advantages of the invention will be evident to those skilled in the art.

SUMMARY OF THE INVENTION

The present invention comprises an open siphon filter and a method for filtering liquids having suspended undissolved solid particles. The filter is constructed from a porous material which is permeable to liquid. The medium may be conformed as a siphon such that at least one intake portion is placed through the surface of the liquid, and at least one discharge portion is positioned lower than the surface of the liquid.

In the open siphon filtration process, liquid flows through a medium by siphonage. Siphonage is defined for purposes of this application as a liquid transportation process in which a hydraulic gradient exists between one level of liquid and a lower level of liquid. The liquid flows into the porous medium in a laminar fashion. This takes advantage of natural sedimentation phenomena, although the invention will work in a turbulent environment. Most of the large particles which do not settle out stop at the surface of the porous medium. Although capillary action will begin the siphonage process, the process is most efficiently begun by saturating the porous medium with liquid in order to prime the apparatus.

An open siphon filter does not have a predefined solid envelope of liquid acting as the siphon. The conduit of an open siphon is formed by the outermost layers of liquid in the porous medium. As the gas pressure around the porous medium decreases, the envelope of liquid inside the porous medium will expand. This envelope of liquid will continue to expand until it completely fills the porous medium. Thus, the cross-sectional surface area of the "conduit" increases and liquid flow increases. As pressure around the medium rises, the envelope of liquid becomes smaller, cross-sectional surface area decreases, and liquid flow slows.

Cake forms at the interface between the porous medium, the gas contacting the porous medium and the surface of the liquid. This occurs because the greatest amount of liquid flow into the porous medium takes place at the surface in a laminar fashion. The cake may bulge from the liquid surface along the surface of the porous medium. As the cake forms, it does not restrict liquid flow because the cake itself is porous. It is continuously made wet, and becomes a part of the porous medium. Once the cake formation grows too heavy, it will fall to the bottom of the reservoir. In closed siphon filters, the solid conduit prevents the cake from acting as a part of a medium since liquid is unable to enter the siphon by moving along the outer surface of the cake.

Another characteristic of the open siphon filter is that no matter how deep the intake portion is placed within the liquid, the liquid is drawn from the uppermost layers of the liquid surface (advantageously having the lowest content of undissolved solid particles). Those particles present are of the smallest size. This is due to the sedimentation of solids in liquids (see the following reference which is incorporated herein for all purposes, J. S. Watson, et al., "RADIOSOTOPIC TRACER OF MEASURING OF SOLIDS CONCENTRATION IN A SETTLING BED OF SOLIDS", *AICHE Journal* (Volume 32, No. 2) 200 (1986)).

The intake liquid flow in an open siphon filter is laminar along the surface (unlike closed siphon filters). This prevents turbulence in the liquid and allows sedimentation to contain more efficiently. Also, low velocity laminar flow minimizes entrainment and maximizes deposition of fine, undissolved solids. (See the following references which are incorporated herein for all purposes, C. Gruesbeck and R. E. Collins, "ENTRAINMENT AND DEPOSITION OF FINE PARTICLES IN POROUS MEDIA", *Society of Petroleum Engineers Journal*, December 1982; Private Reports, Daniel D. Peterson, et al., "DESIGN AND DEVELOPMENT OF A CAPILLARY SIPHON FILTER FOR OIL FIELD BRINES", The University of Texas at Austin, Department of Mechanical Engineering, Mechanical Engineering Design Projects, Summer 1985; Private Reports, R. E. Collins, "GRAVITY-CAPILLARY SIPHON FILTER SYSTEM", Reports I, II, III, IV, V, and VI, October, November, December, 1985, May, June 1986).

Gruesbeck and Collins developed their model of particulate entrainment in porous media with a horizontal structure in which they suggest that there are two parallel pathways. They are "plugging pathways" and "non-plugging pathways". As liquid enters the porous medium, the large "undesirable" particles stop and form the cake, thereby being removed. Smaller particles pass into the medium. The particles which enter the plugging pathways clog the narrow neck of the pathway and stop liquid flow. Gruesbeck and Collins modeled the pathways based on a horizontal structure in which a reverse flow unplugged the plugged pathways and allowed liquid to again flow until the particles re-plugs the pathway neck.

Applicant believes that a similar phenomenon occurs in the vertical embodiment of his filter. As the flow stops in the plugging pathways, the particles drop away from the neck and liquid flows again. As liquid flows more rapidly through the neck, the particles again clog the neck and liquid again stops. This cycle will continue during the filtering process. In the non-plugging pathways, the small particles deposit along the sides until a layer of particles form. Thereafter, the particles pass through the medium.

Although some particles are in fact entrained by the liquid and entrapped by the filter, liquid continues flowing around the particles and finds new paths of flow because the passages interconnect. There is no restricted area of flow as in the closed siphon filter. Rather, there are many open flow channels—defined by the porous structure of the open siphon filter medium.

Another advantage of the present invention is that the gas atmosphere in contact with the liquid and filter medium may be isolated and thereby controlled. For example, the pressure can be set higher or lower than atmospheric pressure, to enhance flow rate, minimize evaporation or avoid liquid oxidation through use of an inert gas. Temperature may be controlled, and the atmosphere can be sterilized for medical or biological applications. Also, the reservoir, porous medium, and any filtered-fluid collector may be enclosed so that the temperature, composition and pressure surrounding the apparatus may be controlled.

These and many other advantages and features of the present invention provide significant improved results in fluid-solid separation. The following non-restrictive example of operation under the method and apparatus of the present invention is given in order to highlight the advantages of the present invention over prior art filters: filtration of oil well completion liquids.

Completion liquids are essentially water with dissolved solids such as calcium chloride, sodium chloride, zinc bromide, etc., the dissolved solids provide the liquid with important characteristics needed in completion operations. Undissolved solids in these dissolved solid liquids can plug the perforation channels of the well and the porous structure of the reservoir; this damages the formation and causes a decrease in well productivity.

Oil technology literature recommends that a number of steps be taken to enhance the filtration process of these liquids. (See for example the following references which are incorporated herein for all purposes: S. S. Sollee, T. D. Elson, and M. K. Lerma, "FIELD APPLICATION OF CLEAN COMPLETION FLUIDS", presented at the 60th Annual Technical Conference and Exhibition of the Society of Petroleum Engineers, held in Las Vegas, Nev., Sept. 22-25, 1985. N. H. Ammerer, R. Hashemi, and J. E. Jewell, "COMPLETION FLUIDS: A GENERIC OVERVIEW", Parts 1, 2, and 3, *Drilling, the Well Site Publication,* May 1983, June 1983, and August 1983. Sharp, K. W and Alan, P. T., "FILTRATION OF OIL FIELD BRINES: A CONCEPTUAL OVERVIEW", SPE 10657 Presented at 1982 Formation Damage Control Symposium, Lafayette, March 24-25. Sparlin, D. and Guidry, J. P, "STUDY OF FILTERS USED FOR FILTERING WORK OVER FLUIDS", SPE 7005 Presented at 1978 Formation Damage Control Symposium, Lafayette, February 13-16.).

Experts recommend filtration of these liquids by processes which involve many steps. The equipment needed includes: a shaker, settling tank, desilter, centrifugal separator, and final polishing filters. These polishing filters combine absolute cartridge filters and diatomaceous earth filters. These solid removal systems have very high capital and operating costs as well as high maintenance costs because these filters build up a cake of solids in the filter media that must be removed periodically. Additionally, these filters require costly powerful pumps for use in extensive liquid handling under high pressures.

The present invention does not require numerous particle removal steps; it does not require the use of pumps, and its "one pass" capability produces an equal or better filtered effluent with a longer service period than conventional systems. This invention's longer service period occurs because the open siphon filter operates mainly as a non-plugging or surface deposit type filter. Since it is non-plugging, a finite flow through the medium will always exist. It is believed that the entrained particles that pass through the filter have a size small enough to accomplish most requirements for industrial applications. From the above-mentioned references relating to filtration of oil field completion liquids, the following data compare the performance of this invention in this particular application:

INFLUENT LOAD TO POLISHING FILTERS: 1,000 ppm/max
INFLUENT LOAD TO CURRENT FILTERS: 500 ppm
INFLUENT LOAD TO PRESENT INVENTION: 1,500 ppm EFFLUENT TURBIDITY ACCEPTABLE: 30 NTU/max
EFFLUENT TURBIDITY CURRENT FILTERS: 8 NTU to 72 NTU
EFFLUENT TURBIDITY PRESENT INVENTION: Less than 1 NTU SERVICE PERIOD CURRENT FILTERS: 16-30 min
SERVICE PERIOD PRESENT INVENTION: Over 30 hr.

The data for the present invention was taken from: "DESIGN AND DEVELOPMENT OF A CAPILLARY SIPHON FILTER FOR OIL FIELD BRINES", University of Texas at Austin, Department of Mechanical Engineering, Mechanical Engineering Design Project, Summer 1985. Experiments conducted by the university were intended only to demonstrate the technical feasibility of siphonal fluid-solid separation processes and apparatus.

This application and accompanying drawings show a preferred embodiment of the invention and suggest various alternatives and modifications of the invention. These are not exhaustive and other changes can be made within the scope of the invention. The suggestions in this application are included so that others skilled in the art will more fully understand the invention.

DESCRIPTION OF THE DRAWINGS

FIG. 2—Side view of another embodiment of the invention wherein the gaseous atmosphere in contact with the porous medium can be modified in its pressure and composition.

FIG. 3—Perspective view of a porous medium configured as a siphon.

FIG. 4—Perspective view of a porous medium plate configured as a siphon.

FIG. 5—Schematic of parallel pathways contemplated by the parallel pathway model describing the deposition of undissolved solid particles in a porous medium.

FIG. 6—Schematic cross-section of porous material for a better understanding of the open siphon filter separation process.

DESCRIPTION OF THE PREFERRED EMBODIMENTS

Figure 1:
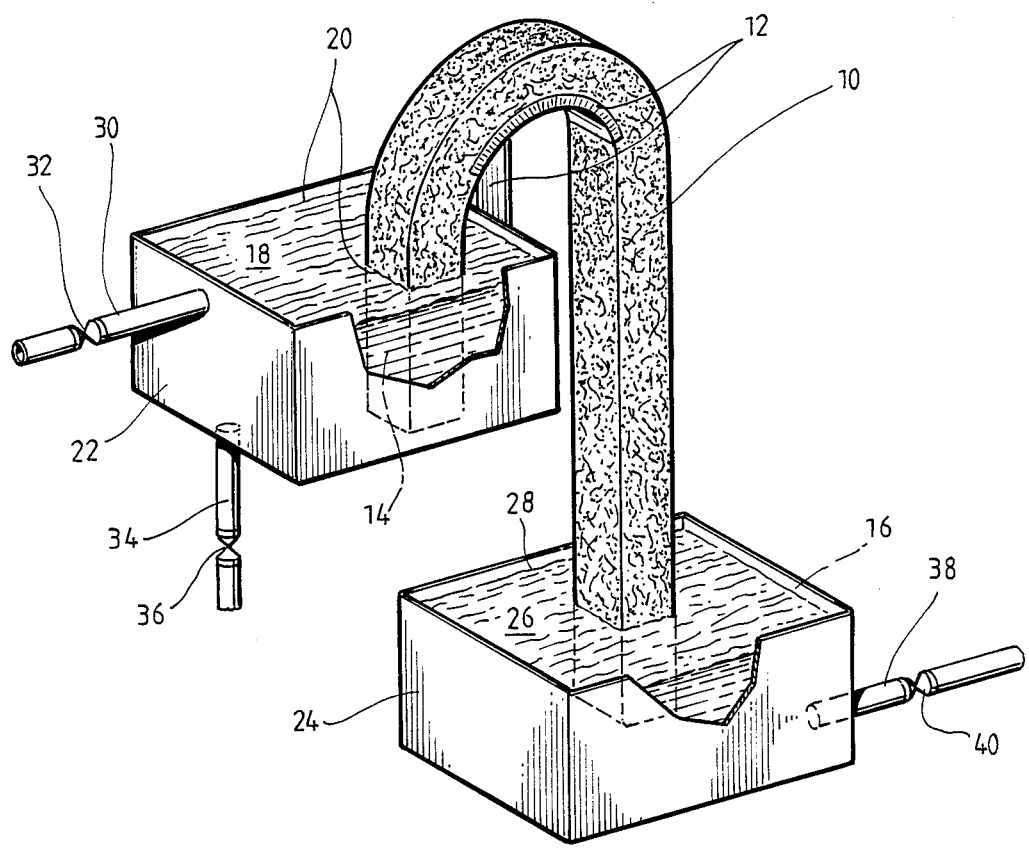
FIG. 1—Perspective view showing an embodiment of the invention.

Referring to FIG. 1, numeral 10 designates the porous medium. Fibrous or filamentous materials such as cotton, wool, polyester, or fiberglass, or mixtures of these or other materials may be used.

The medium 10 is preferably shaped as a siphon with:
A short portion defining an intake end 14,
A long portion defining a discharge end 16,
Suitable support elements 12.
Free of restriction or tight cover over the outer surface.

Media 10 is placed between upper vessel 22 and lower vessel 24 with the intake end 14 preferably in contact with the bottom of upper vessel 22. It should be free of restriction; there should be no tight cover over the surface of the porous medium. Height adjustable support elements 12 may be fixed at the surface level of the liquid in upper vessel 22. The discharge end 16 preferably contacts the bottom of lower vessel 24.

Lower vessel 24 is below vessel 22. Liquid 18 contained in vessel 22 and liquid 28 in vessel 24 create a hydraulic gradient through porous media 10 maintaining siphoning action.

Valve 32 (in inlet 30) opens; liquid 18 having undissolved solid particles 76 is introduced into vessel 22 until liquid level 20 is close to the top of vessel 22; then, valve 32 closes. Liquid 18 wets the intake end 14 and enters porous media 10 at liquid surface level 20. By capillary action, liquid 18 rises through porous media 10 above level 20 to the top portion of porous media 10. The bent portion of porous media 10 directs liquid flow downward toward discharge end 16. Siphoning takes over from capillary action once liquid flow passes liquid level 20 on the downside portion. Filtered liquid 28 exits discharge end 20 into lower vessel 24. At this point, valve 32 and valve 40 (in outlet 38) may be adjusted to maintain a preferred flow rate through the filter. In batch operation, valve 32 remains closed until a new batch of liquid 18 is required for filtration. Drain valve 36 in drain 34 opens for drainage of settled solids at bottom of vessel 22. Porous media 10 may be primed by saturating the media with prefiltered liquid if desired. Although preferably in contact with liquid in vessel 24, discharge end 16 may be left suspended over vessel 24 so that liquid 28 falls from discharge end 16 into vessel 24. Liquid level 20 and support 12 may be adjusted so that the bent portion of the porous medium is in contact with surface level 20.

Liquid 18 enters porous media 10 at liquid level 20 starting the separation process by drawing away the upper most liquid layers. These clean supernatant layers have the lowest particle content, and generally the smallest size particles. Most of the fluid-solids separation occurs where the liquid level 20 contacts porous media 10. The liquid layer having the smallest number of particles 78 flows upwardly through the porous media 10 by low velocity laminar flow, depositing the entrained particles 78 into the pores 64 of plugging pathway 60 and on the surfaces 66 of the non-plugging pathway 62, seen in FIG. 5.

Figure 1A:
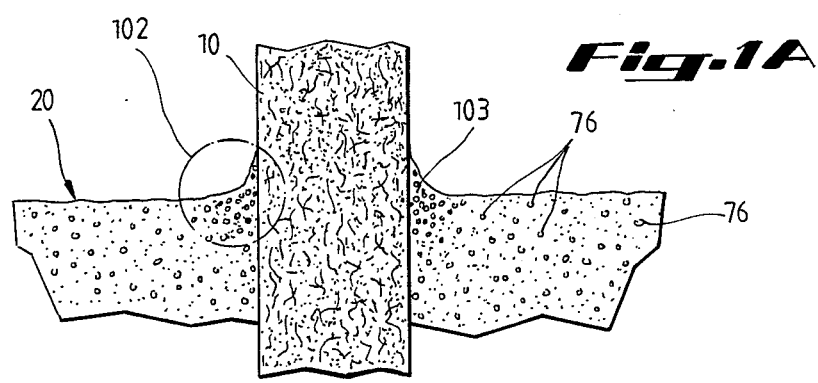
FIG. 1A—Schematic of cake formation at the liquid surface/porous medium interface.

FIG. 1A shows the formation of cake 103 at the liquid surface/porous medium interface 102. Most particles 76 are stopped at this point. They form an additional porous medium through which, and over which, liquid may flow.

Porous media 10 can be configured in many forms and may have any cross-sectional area to fit any particular application. FIG. 3 shows a cylindrically shaped medium. FIG. 4 shows a rectangular shaped medium. Also, media 10 may be made of a composite of several materials having different characteristics and permeabilities to fit any particular application.

Referring to FIG. 2, the same elements of the structure shown in FIG. 1 are designated with the same numerals. An enclosure 42 isolates an inner gaseous atmosphere 52 which contacts porous medium 10 and liquid 18. That is, enclosure 42 permits modification and control of the temperature, pressure and composition of inner atmosphere 52. An inlet 48 may be provided to inject different compositions of gas, to attach a pump for changing the pressure of the gas between the housing and the medium, or to attach an apparatus 101 for control of the temperature of the gas between the housing and the medium. The temperature control may take a variety of forms. It is shown in FIG. 2 as one which heats or cools the gas before the gas enters the housing, but it could take other forms such as heating and cooling coils surrounding the housing. Additionally, the pressure, temperature and composition of the gas may be controlled by a plurality of individual controls, or by a single control apparatus.

Although ends 44 and 46 of enclosure 42 are shown emersed in liquids 18 and 26, this is only to provide a seal for inner atmosphere 52. The enclosure is not intended to work as a siphon. It is desired that the liquid does not flow through the inner space 52, but only through porous medium 10. Enclosure 42 may take a variety of forms, and it may also completely enclose vessels 22 and 24. Additionally, where enclosure 42 is formed as shown in FIG. 2 only enclosing medium 10, a separate container may be used to enclose both vessels 22 and 24 and enclosure 42.

FIG. 6 shows outer surface 70 of porous medium 10 in a schematic cross-section as being formed by filaments 72. The outermost layer of liquid 74 flowing through the porous medium 10 defines the area of flow through medium 10. It is understood that this area is smaller than the cross-sectional area of porous medium 10. Flow rate of liquid may be enhanced by decreasing the pressure of the gaseous atmosphere in contact with the medium. This permits the area of flow 74 to extend closer to outer surface 70. As deposits of particles 78 grow, liquid displaces to new pathways available within porous media 10. Additionally, or alternatively, pressure can be varied on the surface of the liquid in one or both of the reservoirs or vessels to increase or decrease the rate of flow through the medium 10, as desired.

It is understood that the above description is illustrative only and that numerous changes and modifications may be made to the invention without departing from its spirit.

What is claimed is:

1. A method for separation of particles of suspended undissolved solids present in a liquid having a top surface, the method comprising the steps of:

intersecting at least one portion of an open siphon member comprising a porous medium through an interface between the liquid containing the suspended undissolved solids and a gas contacting both the liquid and the porous medium, said porous medium containing a plurality of interconnected internal passageways some of which are dimensioned to plug with particles of the suspended undissolved solids of a given size and some of which are dimensioned to exclude particles of a given size, so that the suspended undissolved solids are either prevented from flowing through the porous medium or are captured by it, positioning at least one other portion of said porous medium lower than the top surface of the liquid and outside of the liquid, isolating the gas contacting the liquid and the porous medium from the atmosphere, controlling the pressure of the isolated gas, siphoning the liquid and ejecting from the porous medium the liquid substantially free of the suspended undissolved solids, and the isolating of the gas, the controlling of the gas pressure and the siphoning occurring simultaneously.

2. A method for separation of particles of suspended undissolved solids present in a liquid having a top surface, the method comprising the steps of:

intersecting at least one portion of an open siphon member comprising a porous medium through an interface between the liquid containing the suspended undissolved solids and a gas contacting both the liquid and the porous medium, said porous medium containing a plurality of interconnected internal passageways some of which are dimensioned to plug with particles of the suspended undissolved solids of a given size and some of which are dimensioned to exclude particles of a given size, so that the suspended undissolved solids are either prevented from flowing through the porous medium or are captured by it, positioning at least one other portion of said porous medium lower than the top surface of the liquid and outside of the liquid, isolating from the atmosphere the gas contacting the liquid and the porous medium, controlling the temperature of the isolated gas, siphoning the liquid and ejecting from the porous medium the liquid substantially free of the suspended undissolved solids, and the isolating of the gas, the controlling of the temperature of the gas, and the siphoning occurring simultaneously.

* * * * *